US00RE34340E

United States Patent [19]

Freeman

[11] E Patent Number: Re. 34,340

[45] Reissued Date of Patent: Aug. 10, 1993

[54] CLOSED CIRCUIT TELEVISION SYSTEM HAVING SEAMLESS INTERACTIVE TELEVISION PROGRAMMING AND EXPANDABLE USER PARTICIPATION

[75] Inventor: Michael J. Freeman, Sands Point, N.Y.

[73] Assignee: ACTV, Inc., New York, N.Y.

[21] Appl. No.: 869,792

[22] Filed: Apr. 16, 1992

Related U.S. Patent Documents

Reissue of:

[64] Patent No.: 4,918,516
Issued: Apr. 17, 1990
Appl. No.: 113,017
Filed: Oct. 26, 1987

[51] Int. Cl.[5] ..... H04N 7/00

[52] U.S. Cl. ..... 358/86; 358/191.1; 434/323

[58] Field of Search ..... 358/84, 86, 146, 181, 358/191.1; 355/2, 4.1, 4.2, 6.3

[56] References Cited

U.S. PATENT DOCUMENTS

| | | | |
|---|---|---|---|
| 4,264,924 | 4/1981 | Freeman | 358/86 |
| 4,264,925 | 4/1981 | Freeman | 358/86 |
| 4,439,784 | 3/1984 | Furukawa et al. | 358/86 |
| 4,507,680 | 3/1985 | Freeman | 358/86 |
| 4,573,072 | 2/1986 | Freeman | 358/86 |
| 4,602,279 | 7/1986 | Freeman | 358/86 |
| 4,647,980 | 3/1987 | Steventon et al. | 358/284 |
| 4,733,301 | 3/1988 | Wright, Jr. | 358/181 |

*Primary Examiner*—Reinhard J. Eisenzop
*Assistant Examiner*—Edward Urban
*Attorney, Agent, or Firm*—Bryan Cave

[57] ABSTRACT

A closed circuit interactive television system (10) provides a multichannel television signal from a localized head end (12 which is used for individualized interactive selections by a plurality of users (22, 24, 26). Each user station contains a conventional televison receiver (32a, 32b, 32c) and a smart box or interface and selection device (30a, 30b, 30c). The smart box interface and selection device (30) is disposed between the television receiver (32) and the RF distribution amplifier (36). The number of user stations (22, 24, 26) on the system (10) is virtually unlimited. The system (10) provides the audio/video television signals (14, 16, 18, 20) in at least frame accurate synchronization to enable seamless video switching between channels, which seamlessness is enhanced through the view of a pair of tuners (44, 46,) in the interface selection box (30a, 30b, 30c) which are alternately commanded to pretune to the channel of the next actual choice made prior to the changeover under control a microprocessor (40) in response to command signals embedded in the television signals being received.

27 Claims, 9 Drawing Sheets

| DESIGNATION | |
|---|---|
| LAST | UNUSED |
| C36 | – |
| L3 | – |
| P9 | – |
| S8 | – |
| Q7 | – |
| X1 | – |
| U16 | – |
| D14 | D9 |
| R60 | R32,42,51 THRU 58 |
| | |

| | | |
|---|---|---|
| U7 | 6809, MOTOROLA | MPU |
| U9 | AMI S6516 | 16 STATIC RAM |
| U8 | INTEL 2732 OR 2764 | 32K OR 64K E-PROM |
| U15 | 74LS 374 | OCTAL D-LATCH |
| U16, U17 | 74LS 595 | 8BIT SHIFT REG. |
| U14 | 74 LS 244 | OCTAL BUFFER |
| U3 | 74 LS 137 | 3 BIT DECODER |
| U2 | 74 LS 02 | QUAD 2 IN NOR |
| U1 | 74 LS 00 | QUAD 2 IN NAND |
| U12, U13 | 74 LS 74 | DUAL D FLIP-FLOP |
| X1 | 4 MHZ | CRYSTAL |

RF BOARD
PIN 7
AFT 1
A1
B1
AFT 2
A2
B2
GND
J1
7PINS
U13
PAR CONTROL
TUNER SW V2,3
DATA
CLOCK
STROBE
CLR
QH'
ODD/EVEN
POR
GND
J2
10 PINS
U17
U16
U1
U14
REMOTE CONTROL
RECEIVER
PIN 6
A
B
C
N.U.
E
DATA READY
GND
A'
B'
U12
SEE NOTE 6
+5V
R4
4.7K
JP2
8 PIN
2 ROW HEADER
TO U2

| | | |
|---|---|---|
| U4 | 74LS161 | SYNCHRONOUS 4-BIT COUNTER |
| U10 | 6850 | ACIA |
| U5 | 74LS93 | 4-BIT BINARY COUNTER |
| U11 | 1488 | QUAD LINE DRIVER |
| U6 | 1489 | QUAD LINE RECEIVER |

CLOSED CIRCUIT TELEVISION SYSTEM HAVING SEAMLESS INTERACTIVE TELEVISION PROGRAMMING AND EXPANDABLE USER PARTICIPATION

Matter enclosed in heavy brackets [ ] appears in the original patent but forms no part of this reissue specification; matter printed in italics indicates the additions made by reissue.

CROSS REFERENCE TO RELATED APPLICATIONS

This application is related to my previously issued U.S. Pat. Nos. 4,507,680 entitled "One Way Interactive multisubscriber Communication System"; 4,573,072 entitled "Method for Expanding Interactive CATV Displayable Choices for a Given Channel Capacity"; 4,602,279 entitled "Method for Providing Targeted Profile Interactive CATV Displays"; 4,264,924 entitled "Dedicated Channel Interactive Cable Television System", and 4,264,925 entitled "Interactive Cable Television System, " the contents of all of which are specifically incorporated by reference herein in their entirety, and is an improvement thereon to enable the provision of discrete closed circuit interactive television systems, such as for training or educational purposes, as opposed to a larger scale cable television or broadcast system such as described in the aforementioned related patents.

TECHNICAL FIELD

The present invention relates to interactive television communication systems and particularly to closed circuit television systems for providing seamless interactive television programming with unlimited expandability of usership.

BACKGROUND ART

Real time conversational student response teaching apparatus are known, such as described in U.S. Pat. Nos. 3,947,972 and 4,078,316. In addition, multiple choice student response systems are well known, such as exemplified by the system disclosed in U.S. Pat Nos. 2,921,385; 3,020,360; 2,826,828; 3,623,238; 3,546,791; 3,273,260; 3,665,615; 3,245,157; 3,284,923; 3,538,621; 3,477,144; 3,708,891; 3,255,536; 2,777,901; 2,908,767; 3,774,316; 3,194,895; 3,484,950, 3,343,280; and 3,763,577 by way of example. None of these Prior Art systems, however, has been adapted to be employed in a closed circuit interactive television system having seamless interactive television programming in what appears to be a two-way interactive network in which the individualized television programming information to be received by the individual users of such a training or educational system may be independently displayed on a common program display channel of a conventional television in response to independent user selection from as multichannel television signal. Moreover, although prior art cable television systems are known in which a plurality of unrelated television programs, under control of a computer, are transmitted over a common television channel for selection by the individual subscribers, such as disclosed in U.S. Pat Nos. 3,814,841 and 3,757,225, such systems are not one way interactive systems capable of independent subscriber selectable reception of simultaneously transmitted multi-information television programming for providing a closed circuit television system having seamless interactive television programming independently displayable on a common program display channel. Furthermore, although my prior U.S. Pat Nos. 4,624,924; 4,624,925; 4,507,680; 4,573, 072; and 4,602,279 are all interactive television systems, they are primarily directed to mass audience cable or broadcast television systems as opposed to a discrete localized closed circuit television system capable of readily providing seamless interactive television programming. Such local education television programming has generally previously been provided through video disc or compact disc searching systems and methods with inherent disadvantages such as requiring one video disc per user with visible rather than seamless branching due to the time required to search and locate an upcoming branch. Moreover, such systems are quite costly, generally cannot run for a great length of time, can only be used by one user at a time and require each user to have a complete system of a player, a video disc and a computer. These disadvantages of the prior art are overcome by the present invention.

DISCLOSURE OF THE INVENTION

The present invention relates to a closed circuit discrete multichannel interactive television system for providing individualized interactive television programming to an expandable plurality of users connected into the closed circuit interactive television system in which switching between individualized televison signals in a multichannel television signal transmitted from a head end occurs in a seamless manner for enabling display on a common program display channel of a given user interactive selection on an associated conventional television receiver via an interface and selection device, or smart box, connected between the television receiver and the head end. The head end is a multichannel television signal transmitter, such as a multiplexed video player or a plurality of single video players for continuously transmitting a multichannel television signal. The multichannel television signal transmission comprises a plurality of different interactively selectable audio/video television signals which are at least in frame accurate synchronization with respect to each other and contain command signals embedded therein for controlling provision of the individualized television programming on the common program display channel. The interface and selection device is responsive to the embedded command signals for enabling the aforementioned switching between the individualized television signals in a substantially instantaneous seamless interactive television display presentation having invisible branching (searching). Different television receivers in the system are capable if displaying different individualized television signals on the common program display channel at substantially the same time dependent on the various independent interactive user selections for the plurality of users at any given time. The interface and selection device may include a microprocessor and a pair of television signal tuners for pretuning the associated television receiver to a television signal frequency corresponding to the next individualized television signal for display on the associated television receiver common program display channel dependent on the user selection before an actual change in the television display on the common program display channel occurs in response to the independent user interactive selection for maintaining seamlessness on the television display despite interactive changes in the television signal selected for display from the multichannel television signal. If desired, the capability of the interactive television programming provided on the closed circuit interactive television system of the present invention may be expanded through the use of stacking of the available responses to be selected. In addition, the system is transparent to the number of users connected to it and may readily be expanded by merely connecting a conventional television receiver to the system via an interface and selection device.

Figure 2:
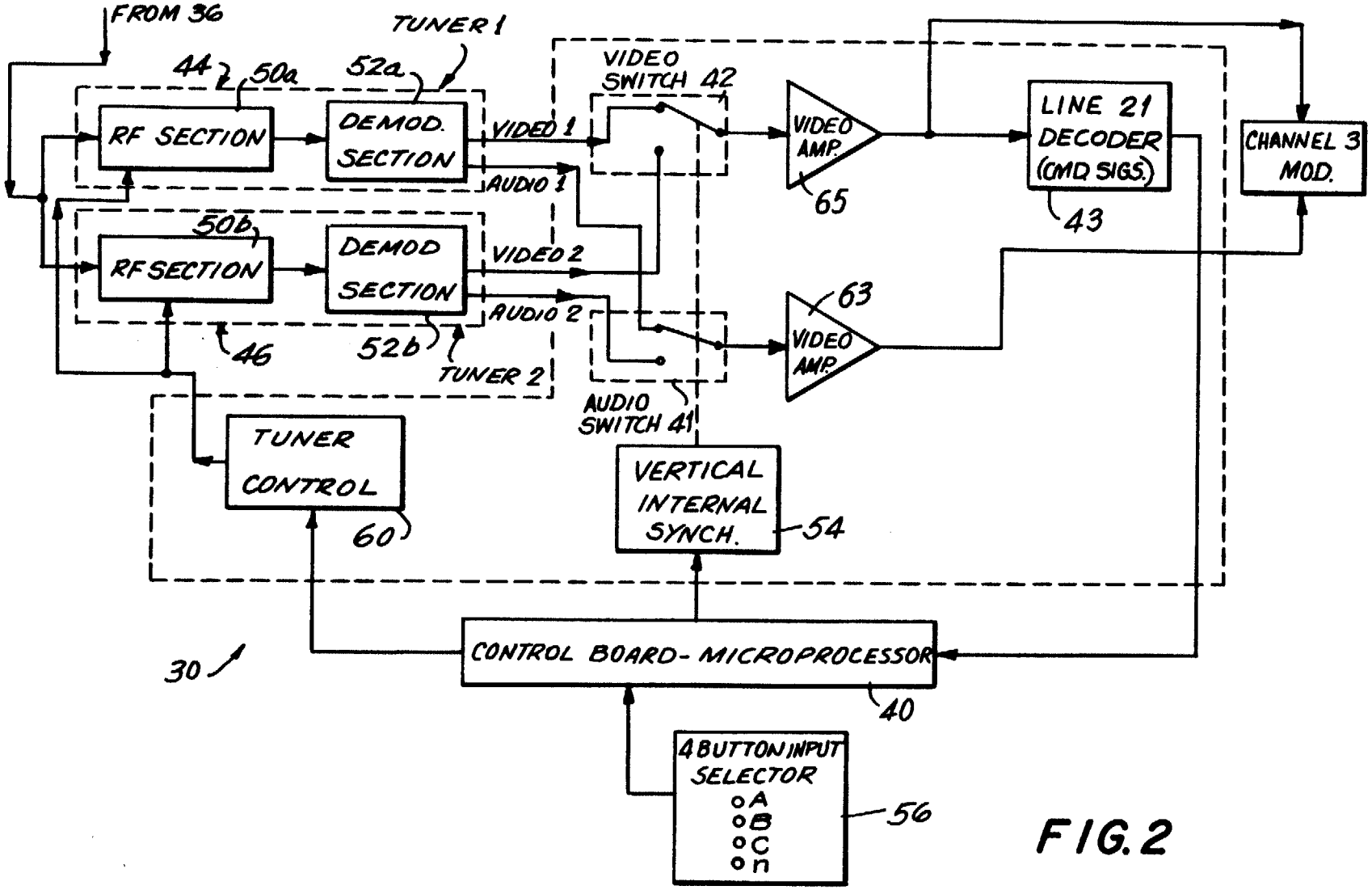
FIG. 2 is a block diagram of a typical presently preferred interface and selection device, or smart box, in accordance with the present invention, for use on the system of FIG. 1.

FIG. [3] *3-3c* is a schematic diagram, partially in block of a typical presently preferred selector board portion of the interface and selection device of FIG. 2; and FIG. [4] *4-4c* is a schematic diagram, partially in block, of a typical presently preferred control board or microprocessor control portion of the interface and selection device of FIG.2.

BEST MODE FOR CARRYING OUT THE INVENTION

Figure 1:
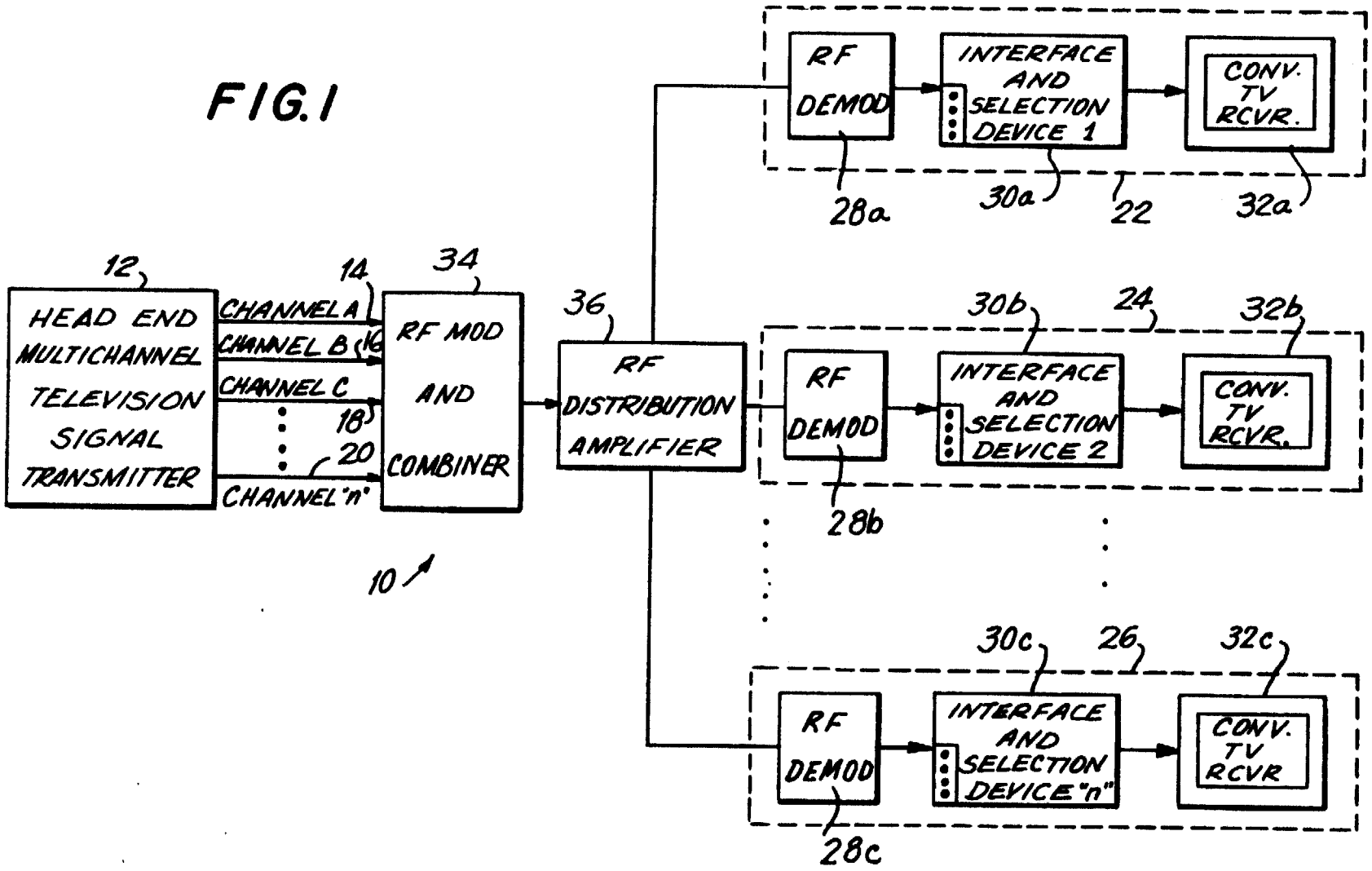
FIG. 1 is a block diagram of the overall presently preferred closed circuit interactive television system in accordance with the present invention.

Referring now to the drawings in detail, and initially to FIG. 1 thereof, the presently preferred closed circuit interactive television system in accordance with the present invention, generally referred to by the reference numeral 10, is shown. The closed circuit television system 10 preferably provides a plurality, preferably four by way of example, of audio/video television signals in at least frame accurate synchronization from a head end multichannel television signal transmitter 12, with four such channels labeled "A" 14, "B" 16, "C" 18 and "n" 20 being shown by way of example in FIG. 1. Preferably all of these television signals 14, 16, 18, 20 are continuously transmitted to the plurality of users in the closed circuit interactive television system 10 which may readily be expanded to include any desired number of users, with "n" such users being represented in FIG. 1 by the three user stations 22, 24, and 26 in FIG. 1. As shown and preferred in FIG. 1, and as will be described in greater detail hereinafter, each user station 22, 24, 26 preferably includes a conventional RF demodulator 28a, 28b, 28c, respectively, an interface and selection device or smart box 30a, 30b, 30c, respectively, and a conventional television receiver 32a, 32b, 32c, respectively, which may preferably receive the desired interactive television programming on a common program display channel, such a channel 3, which is preferably an unused channel for normal television broadcasts so that the television receiver 32a, 32b, 32c may also receive conventional television broadcast. This becomes particularly important in a classroom environment where the television receiver 32a, 32b, 32c is normally used to receive localized television programming created in the school as well as outside conventional television broadcasts as part of the educational instruction in the classroom. In this regard, the presently preferred closed circuit interactive television system 10 of the present invention readily lends itself to such uses as localized educational system for schools, localized training systems, localized control of marketing displays, localized where the headend and 12 is located in one room in the building and the users distributed, gambling systems in hotels, etc., by way of example, throughout the building as opposed to the mass audience systems provided by convention cable television networks.

As further shown and preferred in FIG. 1, the audio/video television signals 14, 16, 18, 20 which are preferably provided simultaneously in frame accurate or better synchronization, may be provided to the various users as a multiplexed multichannel television signal from conventional RF modulators 34 and a combiner via a conventional RF distribution amplifier 36 having as many output ports as students or users connected on the system 10. Users may readily be added or subtracted from the closed circuit interactive television system 10 merely by adding or removing another typical user station 22, 24 or 26. To do this, assuming a user is to be added to the system 10, the user need only add a smart box or interface and selection device 30 between a conventional television receiver 32 and one of the output ports of the RF distribution amplifier 36. The system 10 itself is transparent to the number of users 22, 24 or 26 on the system 10, which provides an unlimited expansion of users with no additional headend hardware or software.

Preferably, each smart box or interface and selection device 30 takes commands, only from the particular channel the associated user is on, from command signals embedded in the audio/video television signals being transmitted from the head end 12 (or can be on the audio subcarriers) and can switch or change between the multiple channels being transmitted. Since the multiple channels of the multichannel television signal being transmitted from the head end are preferably in frame accurate synchronization or better, such switches appear to be seamless, that is the television display never freezes or goes blank, and are essentially instantaneous. As will be described in greater detail hereinafter, preferably the interactive television program being transmitted from the head end 12 is made in such a way as to anticipate possible switches or branch changes and to design the camera shots and audio so that each change will match each other similar to the way a conventional television edit matches. In this manner, the user or viewer would therefore see a seamless television program that contains regular camera cuts as well as camera cuts that also create branches, which means that in addition to a camera cut the channel may also change, such as illustrated by way of example below in Table A:

TABLE A

| Channel A | Channel B | Channel C | Channel "n" |
|---|---|---|---|
| [Camera shot is a wideshot] Thank you for indicating your education level. | Nothing is on this channel at this point | Nothing is on this channel at this point | Nothing is on this channel at this point |

TABLE A-continued

| Channel A | Channel B | Channel C | Channel "n" |
|---|---|---|---|
| [Cut to close up camera shot] I can see from your answer that you never finished high school. I'll remember this and refer to it later. | [Cut to close up camera shot] I can see from your answer that you are a high school graduate. I'll remember this and refer to it later. | [Cut to close up camera shot] I can see from your answer that you are a college graduate. I'll remember this and refer to it later. | [Cut to close up camera shot] I can see from your answer that you have done graduate work. I'll remember this and refer to it later. |

Preferably, in creating the above interactive television programming, the most likely branch is the one that is shot through on a continuous basis. As a result, most of the time camera angle changes are not necessary for a likely branch.

With respect to the head end 12, the source of the prerecorded television signals of the desired interactive television programming can be conventional four ½ inch VHS machines, ¾ inch video tape machines, 1 inch professional machines, video disc players run on synch as opposed to search, or a single tape source that is multiplexed down to hold four separate signals, such as the alternate field and alternate frame approach. The wire or connection from the head end 12 to the various smart boxes or interface and selection devices 30, may preferably be coaxial cable, fiber optics, or direct baseband video and audio, by way of example.

Figures 3, 3A:
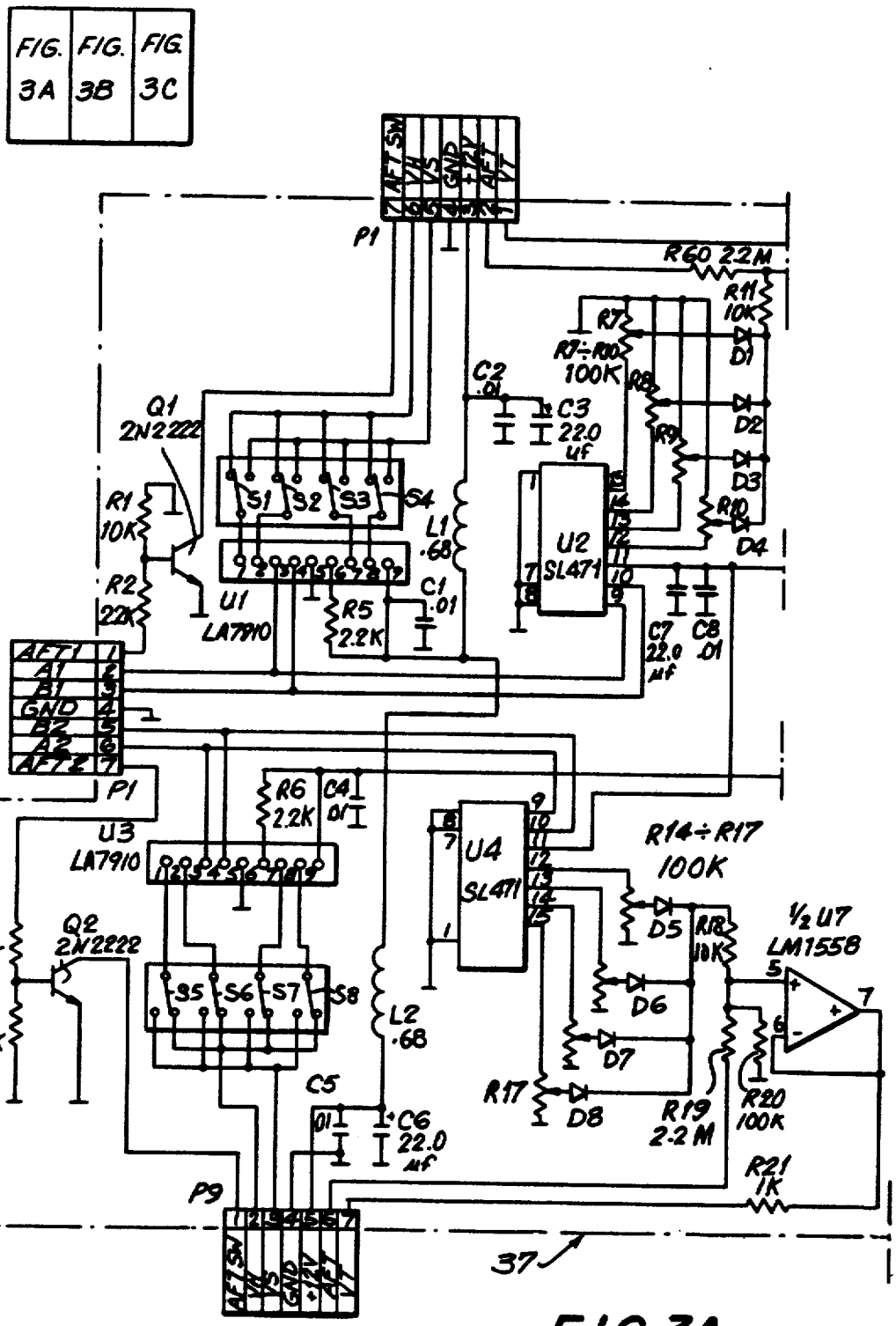
Figure 3B:
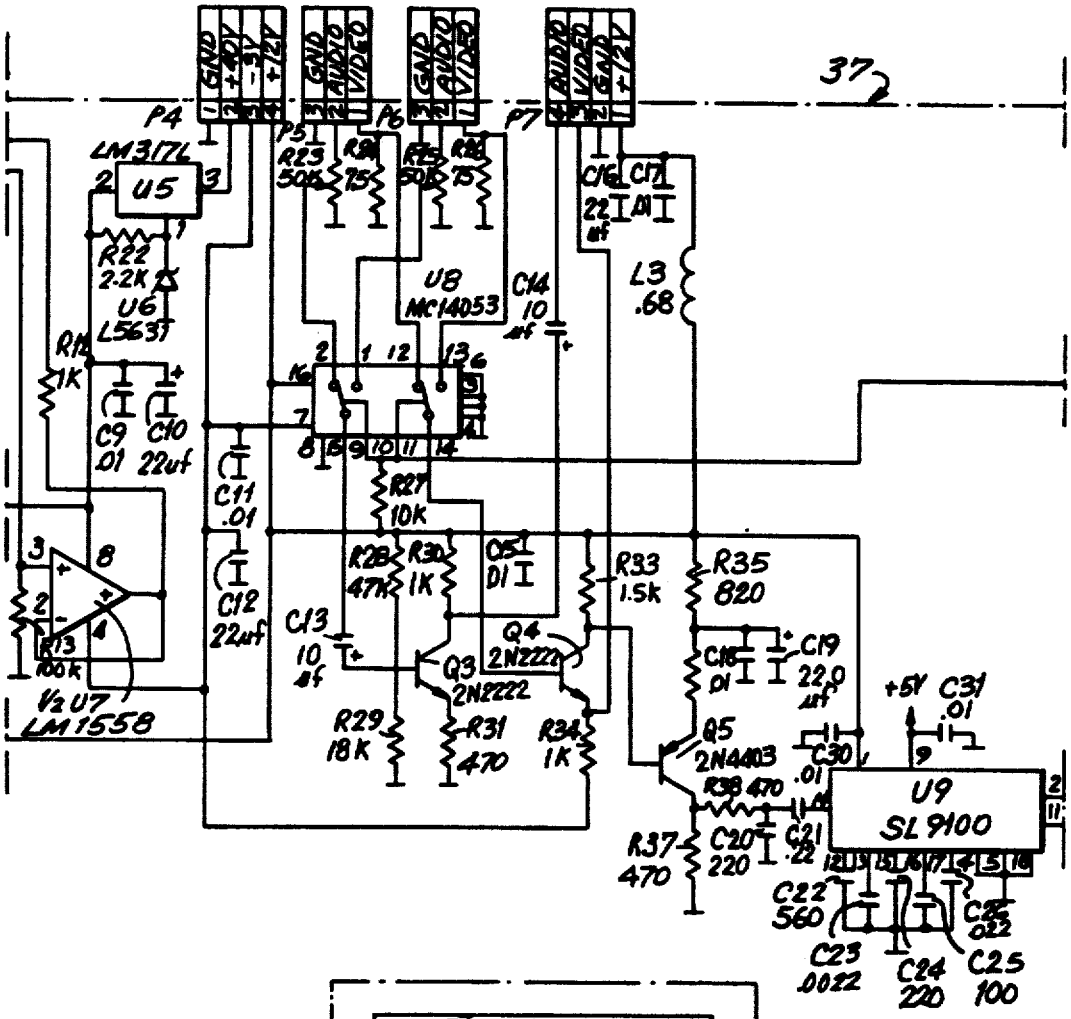
Figure 3C:
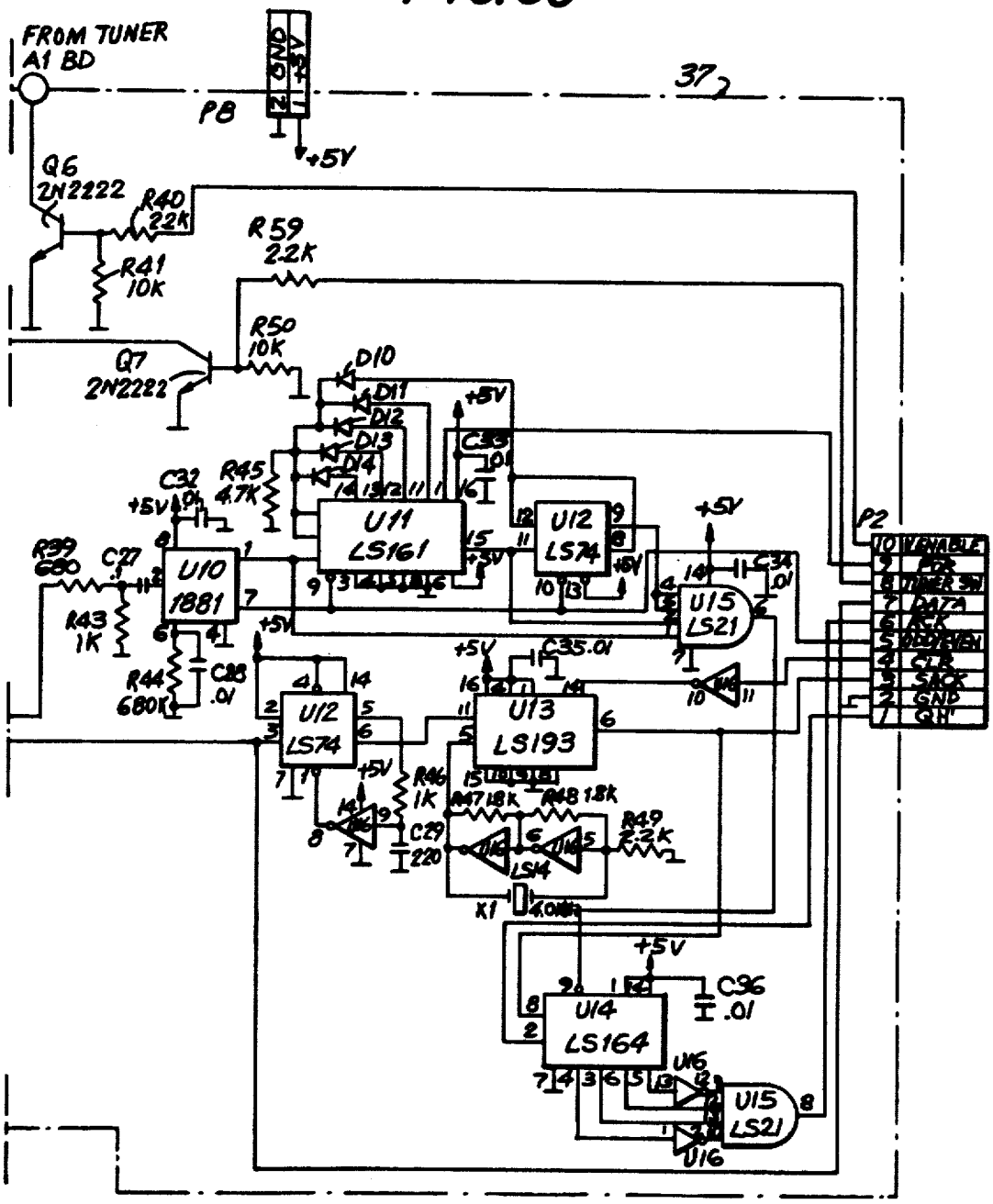
Figure 4:
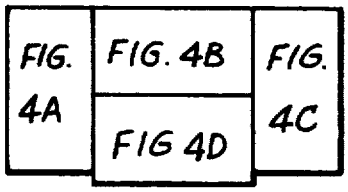
Figure 4A:
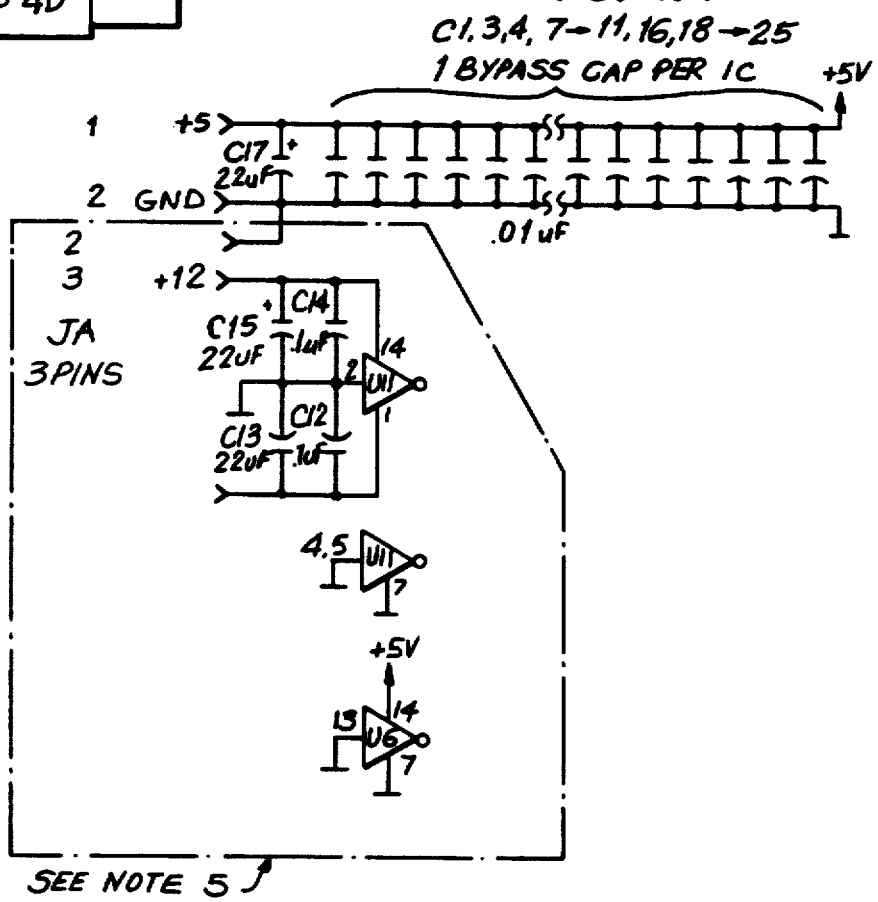
Figure 4B:
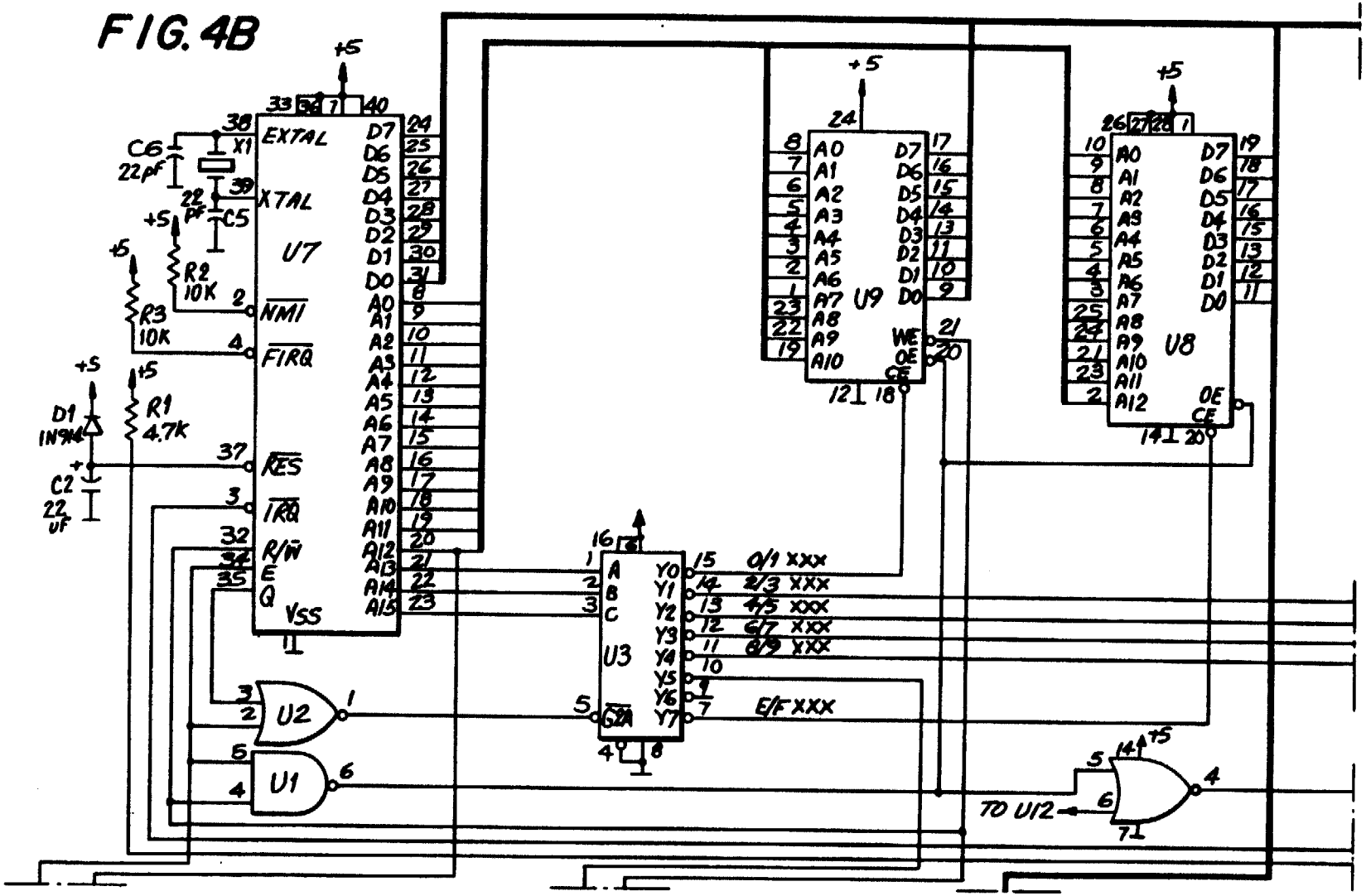
Figure 4C:
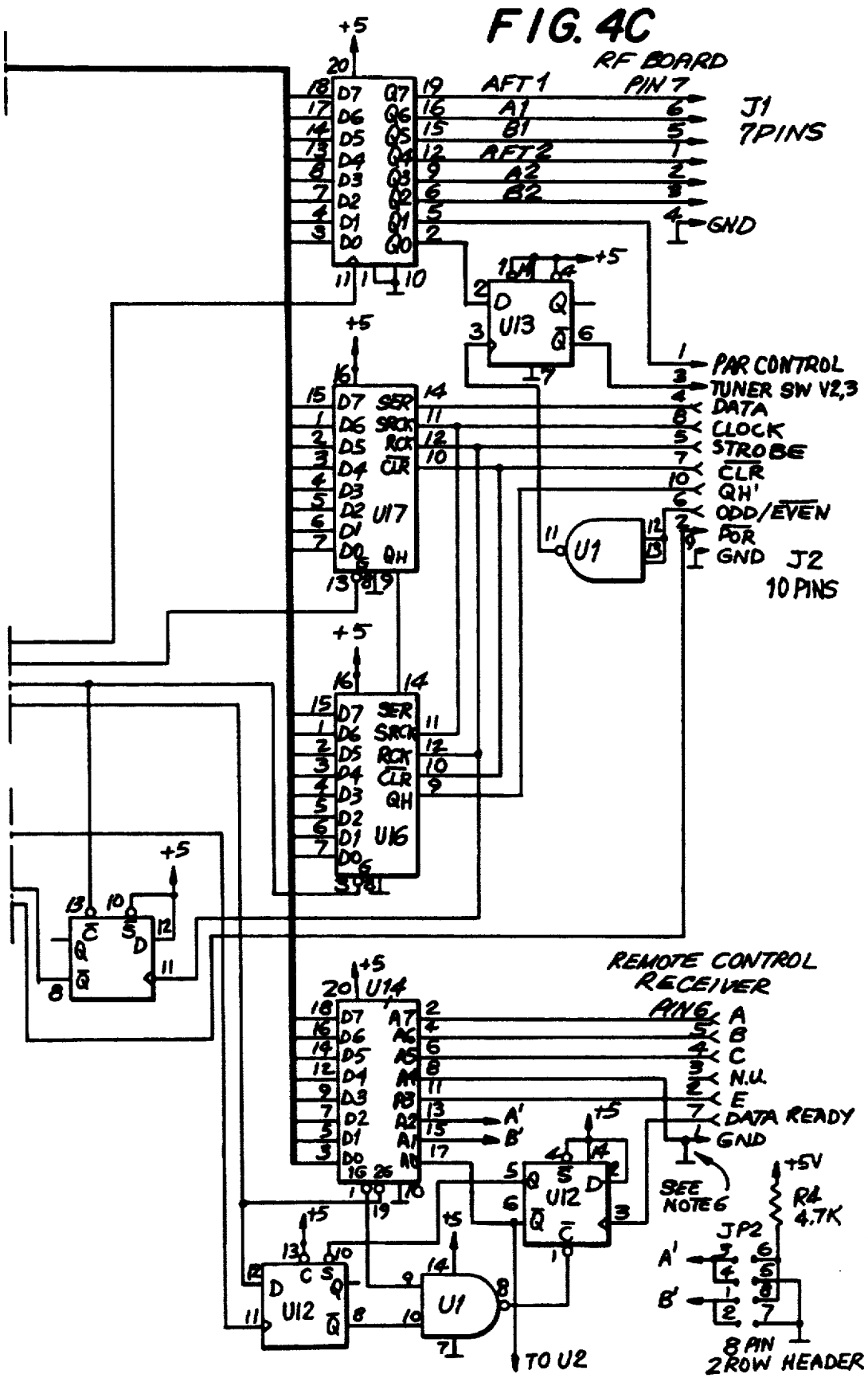
Figure 4D:
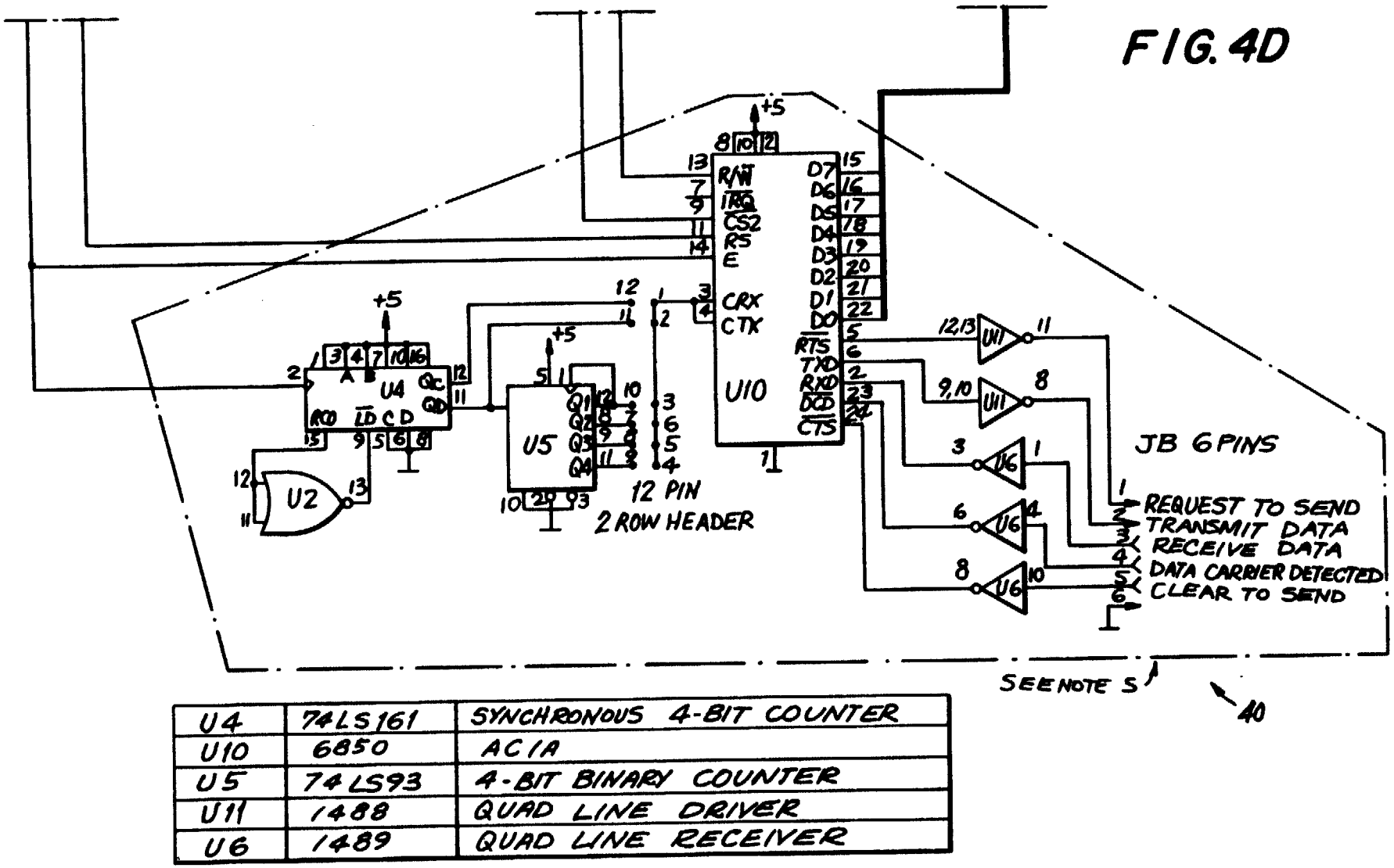

Referring now to FIGS. 2–4, a typical preferred smart box or interface and selection device 30 is shown. As shown and preferred in FIGS. 2–4, the interface and selection device is preferably a microprocessor 40 based device that receives all of the transmitted television signals, such as four in the above example, and can preferably instantaneously switch between all four signals only letting one through to the associated television receiver 32. As shown in FIG. 4, which is a detailed schematic of the microprocessor control board 40 portion of the system 10, readily understandable to one of ordinary skill in the art without further explanation the control board 40 has logic, intelligence, and memory. In addition, as shown and preferred, a pair of conventional television tuners 44, 46 are provided in interface and selection device 30 each of which can tune to the one of the plurality, or 4 by way of example, of signals which it wishes to receive and pass through to the associated television receiver 32. Preferably, the second television tuner 46 is provided to enhance the seamlessness of the system 10. Thus, since conventional television tuners may not be able to tune to one of the other television frequencies fast enough to maintain the seamless nature of the system 10, the second tuner 46 is provided which preferably returns to the proper television frequency that the microprocessor 40 tells it will be the next channel it will be changing to. This preferably happens microseconds before the actual change but this is enough to maintain seamlessness. The first tuner 44 would then be instructed to pretune to the next change that is coming up. Thus, the tuners 44 and 46, which are conventional such as available from Sanyo, and which preferably each comprise an RF section 50a, 50b, respectively and a demodulator section 52a, 52b, respectively alternate in pretuning the channel to the television frequency of the next channel under control of the microprocessor 40 and tuner control 60. As was mentioned in my prior patents, such as U.S. Pat. No. 4,264,924 incorporated by reference herein, a common program display channel which is preferably an unused channel such as channel 3, has an associated conventional modulator 61, with each of the selectable television signals comprising the transmitted multichannel television signal being conventionally tunable to the frequency of channel 3 to permit a television display on channel 3 of the selected signal. The interface and selection device 30 also preferably includes a conventional vertical interval synch detector 54 which detects the vertical synch in the received television signal so as to enable the change or switching between channels at the vertical interval to, once again, enhance seamlessness. The actual switch between tuners/demodulators is accomplished by conventional video switch 42 and conventional audio switch 41. The tuner control 60, audio switch 41, video switch 42, conventional associated audio and video amplifiers 63, 65, and a line 21 decoder, to be described in greater detail hereinafter, comprise the selector board 37 of the interface and selection device 30. FIG. 3, is a detailed schematic of this circuit board 37 which is readily understandable to one of ordinary skill in the art without further explanation. In addition, as input selector 56, such as a four button keypad is provided either independently or on the smart box 32 for enabling the interactive selection of a plurality of different user interactive choices or responses during the interactive programming being transmitted from the head end 12. The input selector is either wired directly to the smart box or communicates via an infrared communications link. In addition, conventional joysticks sensors, buttons and the like may also be employed as user input devices.

Preferably, as previously mentioned, embedded in the various television signals, are instrumentation codes that instruct the smart box 30 in switching, memory, logic and computational codes, which as the manner of coding explained by way of example, in my prior U.S. Pat. No. 4,507,680, the contents of which are incorporated by reference herein in their entirety. The codes, as described in my prior U.S. Pat. No. 4,507,680, are preferably embedded on line 21 and the video signals are decoded by decoder 43 to provide this command information to the microprocessor 40. The smart box 30 preferably only requires the codes that exist on the various television channels it passes through to its associated television receiver 32. It will, thus preferably, not receive, and will ignore, the embedded codes on the other channels. Of course, for each user in the system 10, the resulting code stream is likely to be different because the combinations of the different channels they see will likely be different.

Thus, the presently preferred system 10 has instant invisible branching because the branches come from one of the other three channels that are already in frame accurate synchronization with the source channel. The interactive television programming used with the system 10 is preferably designed so that the channel the user is on will always cut or edit match any other channel the user might change to in the interactive television transmission. This is preferably similar to how an edit is performed in post production video except that in that instance the video will always be on the same channel. Thus, in effect, the present invention 10 is a real time dynamic editing system that creates innumerable combinations and versions of the program based on how the channels are switched, which, in turn, depends on the selection made by the user in conjunction with the corresponding smart box commands.

The system 10 of the present invention may incorporate any of the features set out in any of the aforementioned patents incorporated by reference herein, such as stacking, which is described by way of example in U.S. Pat No. 4,573,072. Suffice to say that four channels, for example, do not limit the system 10 to only four outcomes. Stacking can increase this number to 6, 9 or even more. Stacking provides time delays in responses. Such delays, which are invisible to the user since program material or filler is created on one of the channels, allow for branching to be expanded to more alternatives than the number of available channels. For example, with one channel as filler, six possible outputs can be given; and if this channel filled 2 time slots, then 9 outputs could be given, such as illustrated below in Table B:

TABLE B

| | | | |
|---|---|---|---|
| CHANNEL 1 | DIALOGUE | DIALOGUE FILLER | DIALOGUE FILLER |
| 2 | OUTPUT 1 | OUTPUT 4 | OUTPUT 7 |
| 3 | OUTPUT 2 | OUTPUT 5 | OUTPUT 8 |
| 4 | OUTPUT 3 | OUTPUT 6 | OUTPUT 9 |

By utilizing the system of the present invention, a discrete closed circuit multichannel interactive television system is provided, having instantaneous invisible branching between interactively selected choices, and which is readily expandable through the use of a smart box and a convention television.

What is claimed is:

1. A closed circuit discrete multichannel interactive television system for providing individualized interactive television programming to a plurality of users connected into said closed circuit interactive television system, and system comprising as localized head end multichannel television signal transmission means for transmitting a multichannel television signal comprising a plurality of selectable channels, a plurality of conventional television receiver means for selectively receiving individualized television programming on a common program display channel, and an interface and selection means disposed between each of said television receiver means and said localized head end multichannel television signal transmission means for receiving said transmitted multichannel television signal comprising said plurality of selectable channels and converting it into an individualized selected television channel for display of said selected channel on said common program display channel on the television receiver means associated with a given user in response to an independent user selection of a given interactive response to a plurality of selectable interactive responses in said multichannel television signal transmission, each of said interactive responses being associated with a different channel in said plurality of selectable channels, each of said users having an associated television receiver means and interface and selection means for making said independent interactive user selection for providing said individualized television programming on said common program display channel, said multichannel television signal transmission comprising a plurality of different interactively selectable audio/video television signals respectively associated with each of said plurality of selectable channels comprising said transmitted multichannel television signal, said interactively selectable television signals being in at least frame accurate synchronization with respect to each other, said interactively, selectable television signals further comprising command signals embedded therein for controlling provision of said individualized television programming on said common program display channel, said interface and selection means being responsive to said embedded command signals for enabling switching of said individualized television channel between said plurality of interactively selectable television channels for display of said associated audio/video television signal corresponding to said selected one of said plurality of selectable channels on said common program display channel in a substantially instantaneous seamless interactive television display presentation on said common program display channel of said associated television receiver means, different television receiver means in said system being capable of displaying different individualized associated audio/visual television signals on said common program display channel at substantially the same time dependent on the various independent interactive user selections of respective ones of said plurality of selectable channels by said plurality of users at any given time, said interface and selection means comprising a microprocessor means and a television signal tuner means, said television signal tuner means comprising a pair of tuners one of which is tuned to a currently selected channel of said transmitted multichannel television signal and the other of which is tunable in advance of receipt of a next successive frame to the next selected channel of said transmitted multichannel television signal for providing selective next channel tuning before each channel switching between said plurality of selectable channels, said microprocessor means responding to said individualized independent user interactive selection and said embedded command signals for pretuning said other tuner in said associated television receiver means to a television signal frequency corresponding to said next selected channel for providing a display on said associated television receiver means common program display channel dependent on said independent user selection before an actual change in said television display on said common program display channel from said currently selected channel in said plurality of selectable channels occurs in response to said independent user interactive selection; whereby said seamlessness is maintained for said television display on said common program display channel despite interactive changes in said television channel selected for display from said plurality of channels comprising said multichannel television signal.

2. A closed circuit interactive television system in accordance with claim 1 wherein said plurality of different associated selectable television signals in said multichannel television signal comprise a plurality of edit matched individualized television signals, whereby the television frequency said one tuner of said conventional television means is tuned to at any given time will edit match into any other television frequency said other tuner of said television means is subsequently tuned to in response to a change in said user selection.

3. A closed circuit interactive television system in accordance with claim 2 wherein one of said edit matched individualized television signals comprises a source channel television frequency and said other edit matched individualized television signals comprise different branch channel television frequencies being in frame accurate synchronization with said source channel television frequency, whereby instant vertical interval invisible branching may be provided in response to different user selections.

4. A closed circuit interactive television system in accordance with claim 3 wherein said plurality of different selectable television signals including said source channel comprises four.

5. A closed circuit interactive television system in accordance with claim 3 wherein said source channel comprises the most likely response in a plurality of selectable responses for said user during said television transmission.

6. A closed circuit interactive television system in accordance with claim 1 wherein said multichannel television signal is continuously transmitted to said plurality of conventional television receiver means during a given program interval.

7. A closed circuit interactive television system in accordance with claim 2 wherein said multichannel television signal is continuously transmitted to said plurality of conventional television receiver means during a given program interval.

8. A closed circuit interactive television system in accordance with claim 3 wherein said multichannel television signal is continuously transmitted to said plurality of conventional television receiver means during a given program interval.

9. A closed circuit interactive television system in accordance with claim 4 wherein said multichannel television signal is continuously transmitted to said plurality of conventional television receiver means during a given program interval.

10. A closed circuit interactive system in accordance with claim 5 wherein said multichannel television signal is continuously transmitted to said plurality of conventional television receiver means during a given program interval.

11. A closed circuit interactive television system in accordance with claim 6 wherein said transmitted multichannel television signal comprises a sequence of a plurality of different multichannel television message stacks, each stack comprising a plurality of time concurrent multichannel television messages, said plurality of stacks comprising a stacking array, said stacking array providing a plurality of selectable time and space multiplexed complete prerecorded television messages from said head end, said array being transmitted in said closed circuit system to said interface means, a single substantially complete television message being interactively selectable from said array in response to said user selection for providing an interactive television message as said individualized associated audio/video television signal to said conventional television receiver means in said interface means, the quantity of available interactively selectable prerecorded television messages in said array being greater than the quantity of available different selectable associated television signals, said array comprising a television programming sequence having an interactrively variable program information content for a given television program, said interface means comprising means for interactively selecting a multichannel message path through said array for providing said television programming sequence program information content, said interactive selection being multiplexed in both time and channel choices in said array, said interface means selecting said message path through said array in response to a single interactive selection, a different interactive selection providing a different message path through said array and a different program information content for said television programming sequence.

12. A closed circuit interactive television system in accordance with claim 11 wherein said program content for said given television program further comprises a common prerecorded television message commonly displayable during said given television program irrespective of any interactive selections of said interactively selectable television messages.

13. A closed circuit interactive television system in accordance with claim 12 wherein each of said complete television messages in said array comprising said television programming sequence comprises a segway portion for providing an information transition between said common television message and said television programming sequence, said television programming sequence and said common television message being adjacent in real time in a given television program.

14. A closed circuit interactive television system in accordance with claim 1 wherein said transmitted multichannel television signal comprises a sequence of a plurality of different multichannel television message stacks, each stack comprising a plurality of time concurrent multichannel television messages, said plurality of stacks comprising a stacking array, said stacking array providing a plurality of selectable time and space multiplexed complete prerecorded television messages from said head end, said array being transmitted in said closed circuit system to said interface means, a single substantially complete television message being interactively selectable from said array in response to said user selection for providing an interactive television message as said individualized associated audio/visual television signal to said conventional television receiver means in said interface means, the quantity of available interactively selectable prerecorded television messages in said array being greater than the quantity of available different selectable associated television signals, said array comprising a television programming sequence having an interactively variable program information content for a given television program, said interface means comprising means for interactively selecting a multichannel message path through said array for providing said television programming sequence program information content, said interactive selection being multiplexed in both time and space in said array, said interface means selecting said message path through said array in response to a single interactive selection, a different interactive selection providing a different message path through said array and a different program information content for said television programming sequence.

15. A closed circuit interactive television system in accordance with claim 14 wherein said program content for said given television program further comprises a common prerecorded television message commonly displayable during said given television program irrespective of any interactive selections of said interactively selectable television messages.

16. A closed circuit interactive television system in accordance with claim 15 wherein each of said complete television messages in said array comprising said television programming sequence comprises a segway portion for providing an information transition between said common television message and said television programming sequence, said television programming sequence and said common television messsge being adjacent in real time in a given television program.

17. A closed circuit interactive television system in accordance with claim 3 wherein said transmitted multichannel television signal comprises a sequence of a plurality of different multichannel television message stacks, each stack comprising a plurality of time concurrent multichannel television messages, said plurality of stacks comprising a stacking array, said stacking array providing a plurality of selectable time and space multiplexed complete prerecorded television messages from said head end, said array being transmitted in said closed circuit system to said interface means, a single substantially complete television message being interactively selectable from said array in response to said user selection for providing an interactive television message as said individualized associated audio/video television signal to said conventional; television receiver means in said interface means, the quantity of available interactively selectable prerecorded television messages in said array being greater than the quantity of available different selectable associated television signals, said array comprising a television programming sequence having an interactively variable program information content for a given television program, said interface means comprising means for interactively selecting a multichannel message path through said array for providing said television programming sequence program information content, said interactive selection being multiplexed in both time and space in said array, said interface means selecting said message path through said array in response to a single interactive selection, a different interactive selection providing a different message path through said array and a different program information content for said television programming sequence.

18. A closed circuit interactive television system in accordance with claim 17 wherein said program content for said given television program further comprises a common prerecorded television message commonly displayable during said given television program irrespective of any interactive selections of said interactively selectable television messages.

19. A closed circuit interactive television system in accordance with claim 18 wherein each of said complete television messages in said array comprising said television programming sequence comprises a segway portion for providing an information transition between said common television message and said television programming sequence, said television programming sequence and said common television message being adjacent in real time in a given television program.

*20. A multichannel interactive television system for providing individualized interactive television programming to a plurality of users connected into said interactive television system, said system comprising multichannel television signal transmission means for transmitting a multichannel television signal comprising a plurality of selectable channels, a plurality of conventional television receiver means for selectively receiving individualized television programming on a common program display channel, and an interface and selection means disposed between each of said television receiver means and said multichannel television signal transmission means for receiving said transmitted multichannel television signal comprising said plurality of selectable channels and converting it into an individualized selected television channel for display of said selected channel on said common program display channel on the television receiver means associated with a given user in response to an independent user selection of a given interactive response to a plurality of selectable interactive responses in said multichannel television signal transmission, each of said interactive responses being associated with a different channel in said plurality of selectable channels, each of said users having an associated television receiver means and interface and selection means for making said independent interactive user selection for providing said individualized television programming on said common program display channel, said multichannel television signal transmission comprising a plurality of different interactively selectable audio/video television signals respectively associated with each of said plurality of selectable channels comprising said transmitted multichannel television signal, said interactively selectable television signals being in at least frame accurate synchronization with respect to each other, said interactively, selectable television signals further comprising command signals embedded therein for controlling provision of said individualized television programming on said common program display channel, said interface and selection means being responsive to said embedded command signals for enabling switching of said individualized television channel between said plurality of interactively selectable television channels for display of said associated audio/video television signal corresponding to said selected one of said plurality of selectable channels on said common program display channel in a substantially instantaneous seamless interactive television display presentation on said common program display channel of said associated television receiver means, different television receiver means in said system being capable of displaying different individualized associated audio/visual television signals on said common program display channel at substantially the same time dependent on the various independent interactive user selections of respective ones of said plurality of selectable channels by said plurality of users at any given time, said interface and selection means comprising a microprocessor means and a television signal tuner means, said television signal tuner means comprising a pair of tuners one of which is tuned to a currently selected channel of said transmitted multichannel television signal and the other of which is tunable in advance of receipt of the next successive frame to the next selected channel of said transmitted multichannel television signal for providing selective next channel tuning before each channel switching between said plurality of selectable channels, said microprocessor means responding to said individualized independent user interactive selection and said embedded command signals for pretuning said other tuner in said associated television receiver means to a television signal frequency corresponding to said next selected channel for providing a display on said associated television receiver means common program display channel dependent on said independent user selection before an actual change in said television display on said common program display channel from said currently selected channel in said plurality of selectable channels occurs in response to said independent user interactive selection; whereby said seamlessness is maintained for said television display on said common program display channel despite interactive*

*changes in said television channel selected for display from said plurality of channels comprising said multichannel television signal.*

*21. An interactive television system in accordance with claims 20 wherein said plurality of different associated selectable television signals in said multichannel television signal comprise a plurality of edit matched individualized television signals, whereby the television frequency said one tuner of said conventional television means is tuned to at any given time will edit match into any other television frequency said other tuner of said television means is subsequently tuned to in response to a change in said user selection.*

*22. An interactive television system in accordance with claim 21 wherein one of said edit matched individualized television signals comprises a source channel television frequency and said other edit matched individualized television signals comprise different branch channel television frequencies being in frame accurate synchronization with said source channel television frequency; whereby instant vertical interval invisible branching may be provided in response to different user selections.*

*23. An interactive television system in accordance with claim 20 wherein said multichannel television signal is continuously transmitted to said plurality of conventional television receiver means during a given program interval.*

*24. An interactive television system in accordance with claim 21 wherein said multichannel television signal is continuously transmitted to said plurality of conventional television receiver means during a given program interval.*

*25. An interactive television system in accordance with claim 20 wherein said transmitted multichannel television signal comprises a sequence of a plurality of different multichannel television message stacks, each stack comprising a plurality of time concurrent multichannel television messages, said plurality of stacks comprising a stacking array, said staking array providing a plurality of selectable time and space multiplexed complete prerecorded television messages from said transmission means, said array being transmitted in said system to said interface means, a single substantially complete television message being interactively selectable from said array in response to said user selection for providing an interactive television message as said individualized associated audio/video television signal to said conventional television receiver means in said interface means, the quantity of available interactively selectable prerecorded television messages in said array being greater than the quantity of available different selectable associated television signals, said array comprising a television programming sequence having an interactively variable program information content for a given television program, said interface means comprising means for interactively selecting a multichannel message path through said array for providing said television programming sequence program information content, said interactive selection being multiplexed in both time and channel choices in said array, said interface means selecting said message path through said array in response to a single interactive selection, a different interactive selection providing a different message path through said array and a different program information content for said television programming sequence.*

*26. An interactive television system in accordance with claim 25 wherein said program content for said given television program further comprises a common prerecorded television message commonly displayable during said given television program irrespective of any interactive selections of said interactively selectable television messages.*

*27. An interactive television system in accordance with claim 26 wherein each of said complete television messages in said array comprising said television programming sequence comprises a segway portion for providing an information transition between said common television message and said television programming sequence, said television programming sequence and said common television message being adjacent in real time in a given television program.*

* * * * *